June 4, 1968 M. C. SNEDAKER 3,387,283
ADDRESSING SYSTEM
Filed Feb. 7, 1966
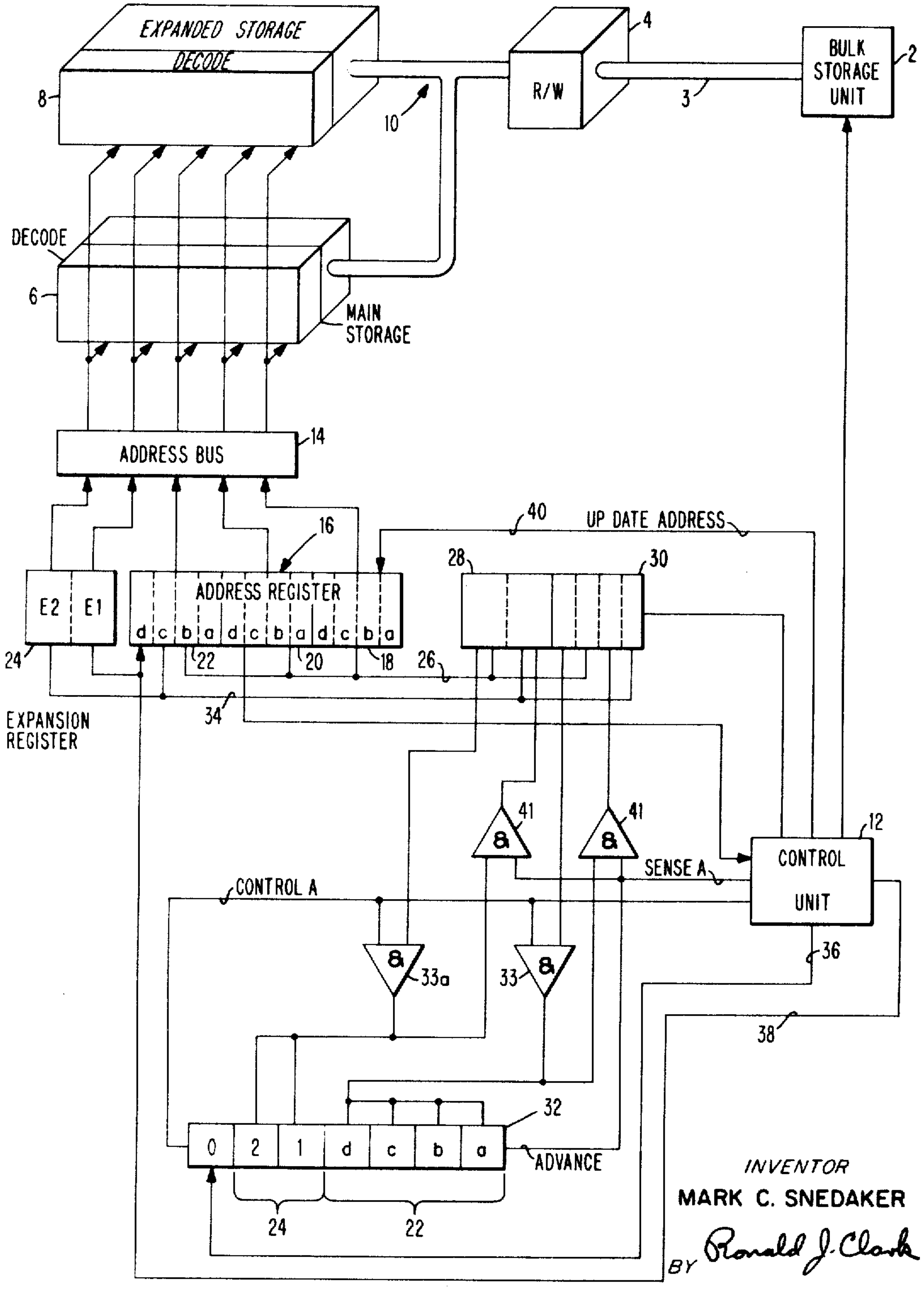
INVENTOR
MARK C. SNEDAKER
BY Ronald J. Clark
ATTORNEY United States Patent Office 3,387,283

Patented June 4, 1968

3,387,283
ADDRESSING SYSTEM

Mark C. Snedaker, Vestal, N.Y., assignor to International Business Machines Corporation, Armonk, N.Y., a corporation of New York Filed Feb. 7, 1966, Ser. No. 525,464
4 Claims. (Cl. 340—172.5)

This invention relates in general to an electronic data processor and its associated bulk storage unit and, more particularly, to an improved addressing circuit for use in said data processor.

The design criterion for a data processing system includes as a requirement, among others, that the type of bulk storage units (BSU) furnishing data to the processing unit operate at a data transfer rate sufficiently below the data acceptance rate of the data processor, thus permitting the processor to perform all its standard functions. One BSU is distinguished from another by many characteristics. One of these characteristics pertinent to the present invention is the rate at which data is transferred from a high velocity bulk storage unit. The receiving data processing unit is equipped normally with a main memory and associated addressing circuits of sufficient storage capacity and operating speed to accept the data in an unbuffered direct transfer from the BSU.

However, in a relatively small capacity processing unit equipped with a relatively slow speed addressing circuit, the BSU transfers data to the processing unit at a rate too high for a processing unit equipped with existing addressing circuits. More specifically, a data processing unit originally designed for operation in a card or tape system cannot operate with a high speed tape unit or a high speed disk storage unit or any other high velocity bulk storage unit under all normal conditions. Such a processing unit is equipped with a core storage circuit or other similar memory devices of sufficient capacity to handle the stored program and data storage requirements of the system. However, by attempting to attach a high velocity BSU with this type of processing unit, additional memory capacity must also be added to handle the increased program storage and data requirements of the altered system. Now the inadequacy of the existing addressing circuits becomes apparent when storing data in the expanded memory area while still maintaining the same memory checking procedures. These storage cycles cross the address boundary of the original memory area and require so many memory cycles to handle the normal address incrementing along with standard checking requirements that the processing unit falls behind in handling the unbuffered data from the high velocity BSU.

Therefore, it is an object of the present invention to provide an improved addressing system for use in a processing unit to reduce the time required in handling the storage of data from an associated high velocity storage unit.

It is a further object of the present invention to provide an improved addressing system employing means for automatically and prematurely altering the address received from an associated high velocity bulk storage unit.

According to these objects, the instant invention contemplates the use of a primary memory area and an expanded memory area, a memory address bus suitable for accessing both memory areas, a plurality of registers for handling each address alteration, for checking for storage overflow and for supplying the current address to the address bus, and a counter responsive to certain of said registers for automatically and prematurely altering the addresses stored in certain of the registers.

The foregoing and other objects, features and advantages of the invention will be apparent from the following more particular description of a preferred embodiment of the invention, as illustrated in the accompanying figure, which is a generalized block diagram of the improved addressing system.

FIG. 1 shows a bulk storage unit (BSU) 2 furnishing data over a first data bus 3 to a read-write unit 4 for storage into a main storage area (MS) 6 and an expanded storage (ES) area 8 over a second data bus 10. The transfer of data from the BSU 2 is under control of a control unit 12.

The MS 6 forms part of an original data processing unit, such as an IBM type 2020, while the ES 8 is added at a later date when it becomes desirable to add a high velocity BSU such as a disk file similar to IBM type 1311.

An address bus 14 is furnished having a capacity greater than that required for use wi h only the MS 6 but adequate for use with both the MS 6 and the ES 8.

An address register 16 is divided into a plurality of sections 18, 20 and 22, each section being able to store an address byte or similar unit employed in the processing system for addressing the MS 6. Each of the registers employed herein is suitable for storing a four bit byte. The bit positions are identified as *a*, *b*, *c* and *d*. An expansion register 24 is employed for selecting between the MS 6 and the ES 8. The register 24 comprises a pair of bit positions E1 and E2 suitable for addressing a storage area four times the size of the MS 6.

A general bus 26 receives address data from any one section of the register 16 and transfers the address data to either of a pair of registers 28 and 30 which are used for address incrementing and overflow checking operations. Other standard address alteration procedures can be employed here, i.e. address decrementing or, incrementing or decrementing by more than one unit. Obviously, data can also flow from either of the registers 28 and 30 to one of the sections 18, 20 or 22. Suitable gating circuits, not shown, control the flow of data throughout the circuit. These gates are controlled by gating signals from the control unit 12.

Address data is transferred from the register 30 to a portion of a counter 32 by suitable gating circuits. The counter 32 comprises a plurality of positions for storing the high order address byte normally found in section 22 of the address register 16 and transferred to the register 30 in anticipation of the address incrementing operation. For simplicity, the contents of the register 30 are transferred to the low four order positions **32*a* through 32*d* of the counter 32 by a CONTROL A signal applied to suitable gating circuits 33. Similarly, the contents of the expansion register 24 are transferred to the register 28 by a special bus 34. The contents of the register 28 are transferred to the next higher positions of the counter 32, positions E1 and E2 by the CONTROL A signal from the control unit 12 and suitable gating circuits 33*a*. The high order position 0 of the counter 32 is available for indicating an OVERFLOW function. The control unit 12 tests for an OVERFLOW condition by sampling the contents of the 0 position of the counter 32 by a line 36**.

In operation, the registers 18, 20 and 22 contain the address employed to store the current data byte into MS 6 or ES 8. The control unit 12 is furnishing control signals in preparation of storing the next successive data byte in the adjacent position to that byte just previously stored. In furtherance of this objective, the control unit 12 applies a transfer signal by a line 38 to the registers 22 and 24 and transfers the contents of these registers to the registers 30 and 28 respectively. The CONTROL A signal now transfers the contents of the registers 28 and 30 to the counter 32.

The processing unit now enters the area of critical timing wherein the address is actually incremented in the registers 18 through 24 in furtherance of the current storage cycle. The first portion of the current address incrementing cycle updates the contents of the register 18 by a signal as a line 40. If the register produces a carry signal indicating a change from the binary fifteen position to the binary zero position, then the next operation of the cycle updates the contents of the register 20. If the register 20 produces a carry, the control unit applies the SENSE A signal to the counter 32 for incrementing its contents and to gating circuits 41 for transferring the contents of the counter 32 to the registers 28 and 30. The fourth portion of the addressing cycle transfers the contents of the registers 28 and 30 to the register 24 and 22 respectively. The address indicia in the registers is now employed to load the next data byte into a location in the ES 8 by the address bus 14 and the address decode circuit 42.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a data processing system an improved addressing system comprising, a storage means having a plurality of individual storage positions, first means for individually addressing selected ones of said storage positions and including means for storing corresponding address indicia, second means for incrementing said address indicia and for sensing a carry signal therefrom, third means responsive to said first means for storing a portion of said address indicia, means for incrementing said address indicia in said third means prior to said incrementing by said second means, and means responsive to said carry sensing means for transferring said incremented address indicia from said third means to said first means.

2. An improved addressing system as recited in claim 1, wherein said third means includes, a temporary storage register responsive to said storage means for storing a portion of said address indicia, a counter responsive to said temporary storage register, and, means intermediate said temporary storage means and said counter for loading said portion of said address indicia into said counter.

3. In a data processing system operating in response to a stored program, an improved addressing system comprising first storage means having a plurality of individually addressed storage positions for storing a plurality of data characters and the stored program and including, a first area suitable for use under normal processing conditions, a second area required for use under expanded processing conditions, a bulk storage unit for storing a plurality of data characters, said unit being controlled by said stored program to transfer selected data characters to said storage means, first means for generating address indicia for selecting individual storage positions in said storage means and including, a second storage means for storing certain of said address indicia, a third storage means for storing other of said address indicia, second means for incrementing said address indicia in said second storage means and for sensing a carry signal therefrom, third means responsive to said third storage means for storing said address indicia therefrom, means for incrementing said address indicia in said third means prior to said incrementing by said second means, and means responsive to said carry sensing means for transferring said incremented address indicia from said third means to said third storage means.

4. In a data handling device, an improved addressing system comprising, a main storage area having a plurality of individual storage positions for storing data, an expanded storage area having a plurality of individual storage positions for storing additional data, a first address register for storing address indicia employed to access each of said positions in said main storage area, a second address register associated with said first register for storing address indicia to distinguish between said main storage area and said expanded storage area, address decode means responsive to said first and to said second address registers for selecting a single position from the available positions in said main storage area and said expanded storage area, means for incrementing said address indicia in said first address register and for sensing a carry therefrom, a temporary storage register responsive to a portion of said first register and to said expansion address register, means for transferring address indicia from said portion of said first address register and said expansion address register to said temporary storage register prior to incrementing said address indicia remaining in said first address register, a counter responsive to said temporary address register, means for transferring said address indicia from said temporary address register to said counter prior to incrementing said address indicia remaining in said first address register, means for incrementing said address indicia in said counter and returning the incremented address to said temporary address register, and means responsive to said carry sensing means for transferring said incremented address indicia from said temporary address register to said first address register and said second addressing register.

References Cited

UNITED STATES PATENTS

| | | | |
|---|---|---|---|
| 3,014,660 | 12/1961 | Patterson et al. | 235—157 |
| 3,266,022 | 8/1966 | Minnick et al. | 340—172.5 |
| 3,284,778 | 11/1966 | Trauboth | 340—172.5 |

ROBERT C. BAILEY, *Primary Examiner.*

R. B. ZACHE, *Assistant Examiner.*